(12) United States Patent
Cook

(10) Patent No.: US 10,477,765 B2
(45) Date of Patent: Nov. 19, 2019

(54) ROTATABLE COUPLER FOR A REEL ARM OF A REEL HEADER

(71) Applicant: CNH Industrial America LLC, New Holland, PA (US)

(72) Inventor: Joel Cook, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 132 days.

(21) Appl. No.: 15/710,523

(22) Filed: Sep. 20, 2017

(65) Prior Publication Data

US 2019/0082599 A1   Mar. 21, 2019

(51) Int. Cl.
*A01D 41/16* (2006.01)
*A01D 57/03* (2006.01)
*A01D 41/127* (2006.01)

(52) U.S. Cl.
CPC ............. *A01D 41/16* (2013.01); *A01D 57/03* (2013.01); *A01D 41/1274* (2013.01)

(58) Field of Classification Search
CPC ........ A01D 57/03; A01D 57/02; A01D 57/04; A01D 41/16; A01D 41/1274
See application file for complete search history.

(56) References Cited

U.S. PATENT DOCUMENTS

| | | | | |
|---|---|---|---|---|
| 1,770,077 A | * | 7/1930 | Kunz | A01D 57/04 |
| | | | | 56/226 |
| 2,115,385 A | * | 4/1938 | Edgington | A01D 57/04 |
| | | | | 56/226 |
| 2,413,072 A | * | 12/1946 | Sage | A01D 57/04 |
| | | | | 56/222 |
| 2,431,397 A | * | 11/1947 | Harrison | A01D 57/04 |
| | | | | 56/226 |
| 2,795,921 A | * | 6/1957 | Hume | A01D 57/04 |
| | | | | 56/226 |
| 3,345,808 A | * | 10/1967 | Van Der Lely | A01D 34/246 |
| | | | | 56/10.2 R |
| 3,511,362 A | | 5/1970 | Gaeddert et al. | |

(Continued)

FOREIGN PATENT DOCUMENTS

| | | |
|---|---|---|
| CA | 2876686 A1 | 6/2016 |
| EP | 2923557 A1 | 9/2015 |

OTHER PUBLICATIONS

Extended European Search Report for EP Application No. 18194922.3 dated Mar. 15, 2019 (5 pages).

*Primary Examiner* — Arpad Fabian-Kovacs
(74) *Attorney, Agent, or Firm* — Peter K. Zacharias; Patrick M. Sheldrake

(57) ABSTRACT

A reel arm for a header of an agricultural harvester comprising a rotatable coupler, a first linkage assembly and a second linkage assembly is disclosed. The rotatable coupler has a central rotational axis and includes a control shaft extending therethrough parallel to the central rotational axis. The first linkage assembly includes a first end connected to the control shaft about a first lateral side of the rotatable coupler and a second end opposite the first end for connection to a reel tine bar of a first reel assembly of the header. The second linkage assembly includes a first end connected to the control shaft about a second lateral side of the rotatable coupler and a second end opposite the first end for connection to a reel tine bar of a second reel assembly of the header.

20 Claims, 9 Drawing Sheets

(56) References Cited

U.S. PATENT DOCUMENTS

| | | | | |
|---|---|---|---|---|
| 3,546,863 | A | 12/1970 | Connolly | |
| 3,550,366 | A * | 12/1970 | Gibson | A01D 57/02 56/226 |
| 3,771,299 | A * | 11/1973 | Gradwohl | A01D 57/03 56/220 |
| 4,067,177 | A | 1/1978 | Tout | |
| 4,156,340 | A | 5/1979 | Colgan et al. | |
| 4,751,809 | A * | 6/1988 | Fox | A01D 57/02 56/220 |
| 4,776,155 | A * | 10/1988 | Fox | A01D 57/02 29/455.1 |
| 5,768,870 | A * | 6/1998 | Talbot | A01D 57/03 56/220 |
| 6,170,244 | B1 * | 1/2001 | Coers | A01D 57/03 460/142 |
| 6,442,918 | B1 * | 9/2002 | Fox | A01D 57/03 56/220 |
| 6,530,202 | B1 * | 3/2003 | Guyer | A01D 57/03 56/220 |
| 6,591,598 | B2 * | 7/2003 | Remillard | A01D 57/03 56/221 |
| 6,698,175 | B1 * | 3/2004 | Schumacher | A01D 57/03 56/14.4 |
| 6,708,475 | B2 * | 3/2004 | Guyer | A01D 57/03 56/220 |
| 6,843,045 | B2 | 1/2005 | Bickel | |
| 6,910,323 | B2 | 6/2005 | Bickel | |
| 7,131,253 | B2 * | 11/2006 | Remillard | A01D 57/02 56/14.4 |
| 7,665,287 | B2 | 2/2010 | Jones | |
| 7,856,801 | B2 * | 12/2010 | Remillard | A01D 57/02 56/220 |
| 8,151,547 | B2 | 4/2012 | Bich et al. | |
| 9,526,209 | B2 | 12/2016 | Honey | |
| 9,844,183 | B2 * | 12/2017 | Honey | A01D 57/03 |
| 10,238,033 | B2 * | 3/2019 | Schwinn | A01D 57/03 |
| 2007/0204583 | A1 * | 9/2007 | Coers | A01D 57/02 56/14.4 |
| 2007/0289278 | A1 * | 12/2007 | Coers | A01D 41/141 56/14.4 |
| 2009/0120049 | A1 * | 5/2009 | Schumacher | A01D 57/02 56/227 |
| 2012/0047867 | A1 * | 3/2012 | Coers | A01D 57/02 56/220 |
| 2016/0183465 | A1 * | 6/2016 | Honey | A01D 57/12 56/226 |
| 2016/0255773 | A1 | 9/2016 | Rayfield et al. | |

* cited by examiner

ROTATABLE COUPLER FOR A REEL ARM OF A REEL HEADER

The exemplary embodiments of the subject disclosure relate generally to a header of a plant cutting machine (e.g., a combine harvester) and, more specifically, to a header reel having a central reel arm with a rotatable coupler for transmitting reel tine timing from one reel assembly to another.

BACKGROUND OF THE INVENTION

An agricultural harvester e.g., a plant cutting machine, such as, but not limited to, a combine or a windrower, generally includes a header located at its front portion and operable for severing and collecting plant or crop material as the harvester is driven over a crop field. The header has a plant collecting mechanism, e.g., a rotatable reel, and a plant cutting mechanism, e.g., a cutter bar or sickle blade assembly. Traditional rotatable reels include one or more tine bars with tines extending forwardly from the tine bars and towards the crop to be cut. The tines are configured to sweep crop towards the cutter bar as the header moves through the crop field and assist in collecting crop that have been cut by the cutter bar by pulling the crop onto a collection surface, e.g., a draper belt.

Typically, the rotatable reel is supported with two reel arms, i.e., support arms, one located on each side of the reel. As headers get larger, so do the rotatable reels or the number of reels on the header. However, larger reels may be too large to be supported by two support arms. Thus, additional support arms are used to support the larger reel. In addition, a split reel, i.e., two smaller reels, can be used to more evenly distribute the weight of the reel. However, having more than one reel requires separate driving mechanisms which can cause the tine bars to go out of sync during use or construction thereby causing inefficient crop collection.

Therefore, what is desired is a header capable of accommodating for changes in terrain while still maintaining efficient crop gathering. When the disclosed exemplary embodiments are used in combination with an agricultural harvester, the embodiments overcome one or more of the disadvantages referenced above by providing a header having a reel arm connected to a rotatable coupler for keeping the motion of tine bars and placement of their tines in sync.

BRIEF SUMMARY OF THE INVENTION

The present exemplary embodiments provide a header for an agricultural harvester having a reel arm with a rotatable coupler connected to one or more rotatable reels.

In accordance with an exemplary embodiment of the subject disclosure, there is provided a reel arm for a header of an agricultural harvester comprising a rotatable coupler, a first linkage assembly and a second linkage assembly. The rotatable coupler has a central rotational axis and a control shaft extending through the rotatable coupler in a direction parallel to the central rotational axis. The first linkage assembly includes a first end and a second end. The first end of the first linkage assembly is connected to the control shaft about a first lateral side of the rotatable coupler. The second end of the first linkage assembly is opposite the first end of the first linkage assembly for connecting to a reel tine bar of a first reel assembly of the header. The second linkage assembly includes a first end and a second end. The first end of the second linkage assembly is connected to the control shaft about a second lateral side of the rotatable coupler. The second end of the second linkage assembly is opposite the first end of the second linkage assembly for connecting to a reel tine bar of a second reel assembly of the header.

In an aspect of the exemplary embodiment, the first and second linkage assemblies each include a first link connected to the control shaft, a second link for connecting to a respective reel tine bar, and a third link connecting the first and second links. The first link of each of the first and second linkage assemblies is rigidly connected to the control shaft for rotation therewith. The second link of each of the first and second linkage assemblies is rigidly connected to the reel tine bar of respective first and second reel assemblies for rotation therewith. The third link of each of the first and second linkage assemblies is pivotably connected to the first and second links of respective first and second linkage assemblies.

In another aspect of the exemplary embodiment, the rotatable coupler includes a plurality of control shafts each extending therethrough and circumscribing the central rotational axis. Each of the plurality of control shafts is connected to a respective first and second linkage assembly.

In accordance with another exemplary embodiment of the subject disclosure, there is provided a header of an agricultural harvester comprising a frame, a reel arm, a first reel assembly, a second reel assembly, a rotatable coupler, a first linkage assembly and a second linkage assembly. The reel arm is connected to the frame. The first reel assembly is connected to the frame and includes a central rotatable shaft and a plurality of tine bars extending widthwise across the first reel assembly. The plurality of tine bars of the first reel assembly are connected to the central rotatable shaft for rotation therewith. The second reel assembly is connected to the frame and includes a central rotatable shaft and a plurality of tine bars extending widthwise across the second reel assembly. The plurality of tine bars of the second reel assembly are connected to the central rotatable shaft for rotation therewith. The rotatable coupler is supported by the reel arm, and is connected to at least one of the central rotatable shafts of the first and second reel assemblies. The first linkage assembly connects the rotatable coupler to one of the plurality of tine bars of the first reel assembly. The second linkage assembly connects the rotatable coupler to one of the plurality of tine bars of the second reel assembly.

In an aspect of the exemplary embodiment, the rotatable coupler includes a control shaft extending through the rotatable coupler that is spaced from the central rotatable shaft. Each of the first and second linkage assemblies include a first link, a second link and a third link. The first link is connected to the control shaft. The second link is connected to one of the tine bars of the plurality of tine bars of respective first and second reel assemblies. The third link connects the first and second links of respective first and second linkage assemblies. Additionally, each of the first and second linkage assemblies is connected to the control shaft.

In another aspect of the exemplary embodiment, the header consists essentially of a single cam assembly for guiding movement of the first and second reel assemblies. The single cam assembly includes a cam track for operatively engaging the first reel assembly.

In yet another aspect of the exemplary embodiment, the rotatable coupler is positioned between the first reel assembly and the second reel assembly. The rotatable coupler includes a plurality of control shafts each extending therethrough and circumferentially spaced around the central rotatable shaft. Additionally, each of the plurality of control shafts is operatively connected to a respective first and second linkage assembly.

In another aspect of the exemplary embodiment, the rotatable coupler includes a plurality of control shafts extending from opposite lateral sides of the rotatable coupler. A pair of the plurality of control shafts are coaxial. Additionally, a central longitudinal axis of the central rotatable shaft of the first reel assembly is offset from a central longitudinal axis of the central rotatable shaft of the second reel assembly.

In accordance with another exemplary embodiment of the subject disclosure, there is provided a header of an agricultural harvester comprising a frame, a first reel assembly, a reel arm, a rotatable coupler and a first linkage assembly. The first reel assembly includes a central rotatable shaft having a longitudinal axis and a plurality of tine bars extending widthwise across the first reel assembly. The plurality of tine bars of the first reel assembly are connected to the central rotatable shaft for rotation therewith. The reel arm is connected to the frame and supports the first reel assembly. The rotatable coupler has a rotational axis aligned with the longitudinal axis of the central rotatable shaft and is connected to the reel arm. The first linkage assembly connects the rotatable coupler to one of the plurality of tine bars of the first reel assembly.

In an aspect of the exemplary embodiment, the header further includes a second reel assembly and a second linkage assembly. The second reel assembly is adjacent to the first reel assembly and includes a tine bar extending widthwise across the second reel assembly. The second linkage assembly is located on a side of the rotatable coupler opposite the first linkage assembly. The second linkage assembly connects the rotatable coupler to the tine bar of the second reel assembly.

Other features and advantages of the subject disclosure will be apparent from the following more detailed description of the exemplary embodiments, taken in conjunction with the accompanying drawings which illustrate, by way of examples, the principles of the subject disclosure.

BRIEF DESCRIPTION OF THE SEVERAL VIEWS OF THE DRAWINGS

The foregoing summary, as well as the following detailed description of the exemplary embodiments of the subject disclosure, will be better understood when read in conjunction with the appended drawings. For the purpose of illustrating the subject disclosure, there are shown in the drawings exemplary embodiments. It should be understood, however, that the invention is not limited to the precise arrangements and instrumentalities shown.

In the drawings.

DETAILED DESCRIPTION OF THE INVENTION

Figure 1:
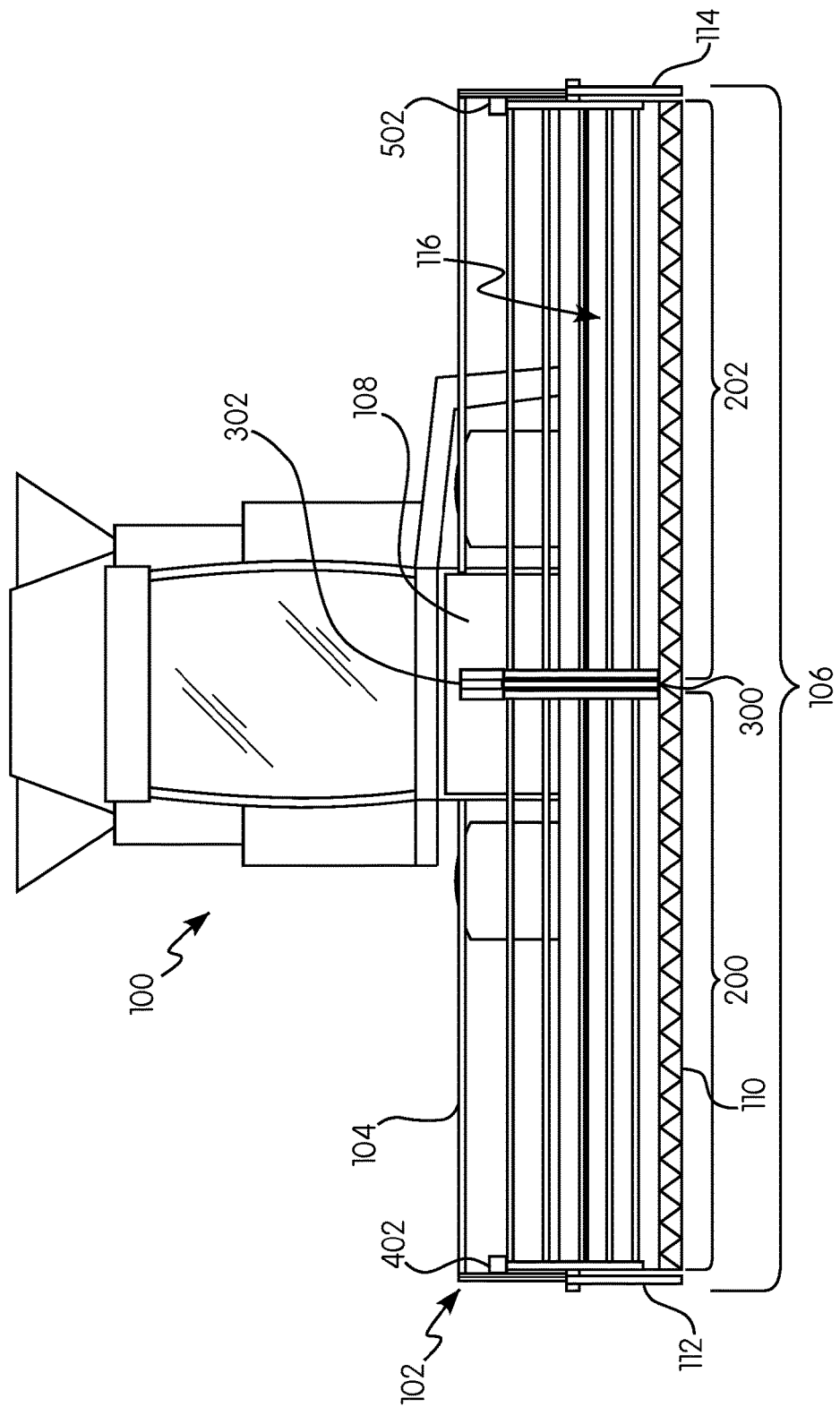
FIG. 1 is a front elevation view of an agricultural harvester including a header in accordance with an exemplary embodiment of the subject disclosure.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject disclosure in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the exemplary embodiments is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

Throughout this disclosure, various aspects of the subject disclosure can be presented in a range format. It should be understood that the description in range format is merely for convenience and brevity and should not be construed as an inflexible limitation on the scope of the exemplary embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the exemplary embodiments can be practiced without one or more of the specific features or advantages of a particular embodiment. In other instances, additional features and advantages may be recognized in certain embodiments that may not be present in all exemplary embodiments of the subject disclosure.

Figure 2:
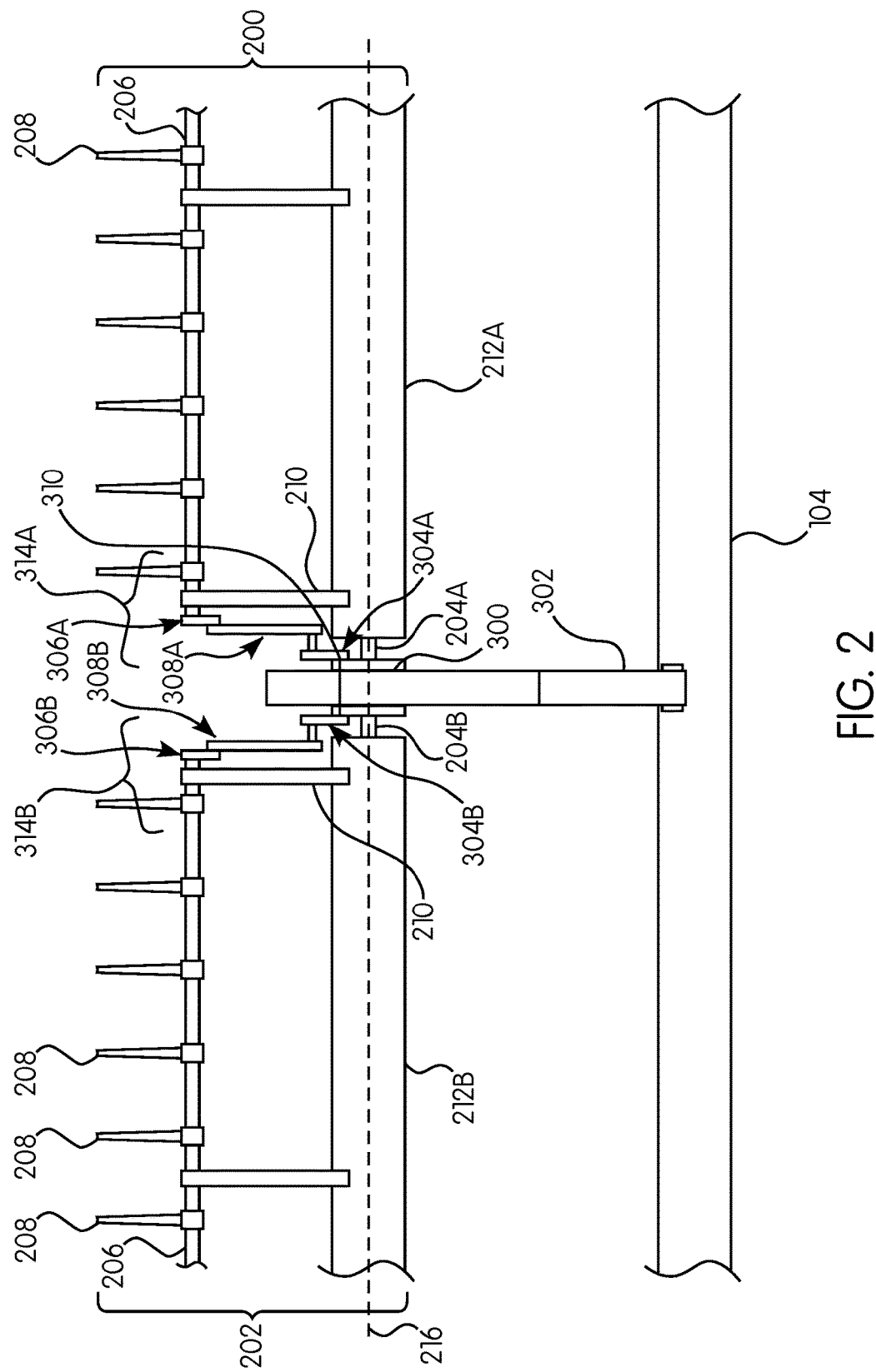
FIG. 2 is a partial top view of an exemplary embodiment of a rotatable coupler, a reel arm, a first reel assembly and a second reel assembly applicable to the header of FIG. 1.
Figure 3:
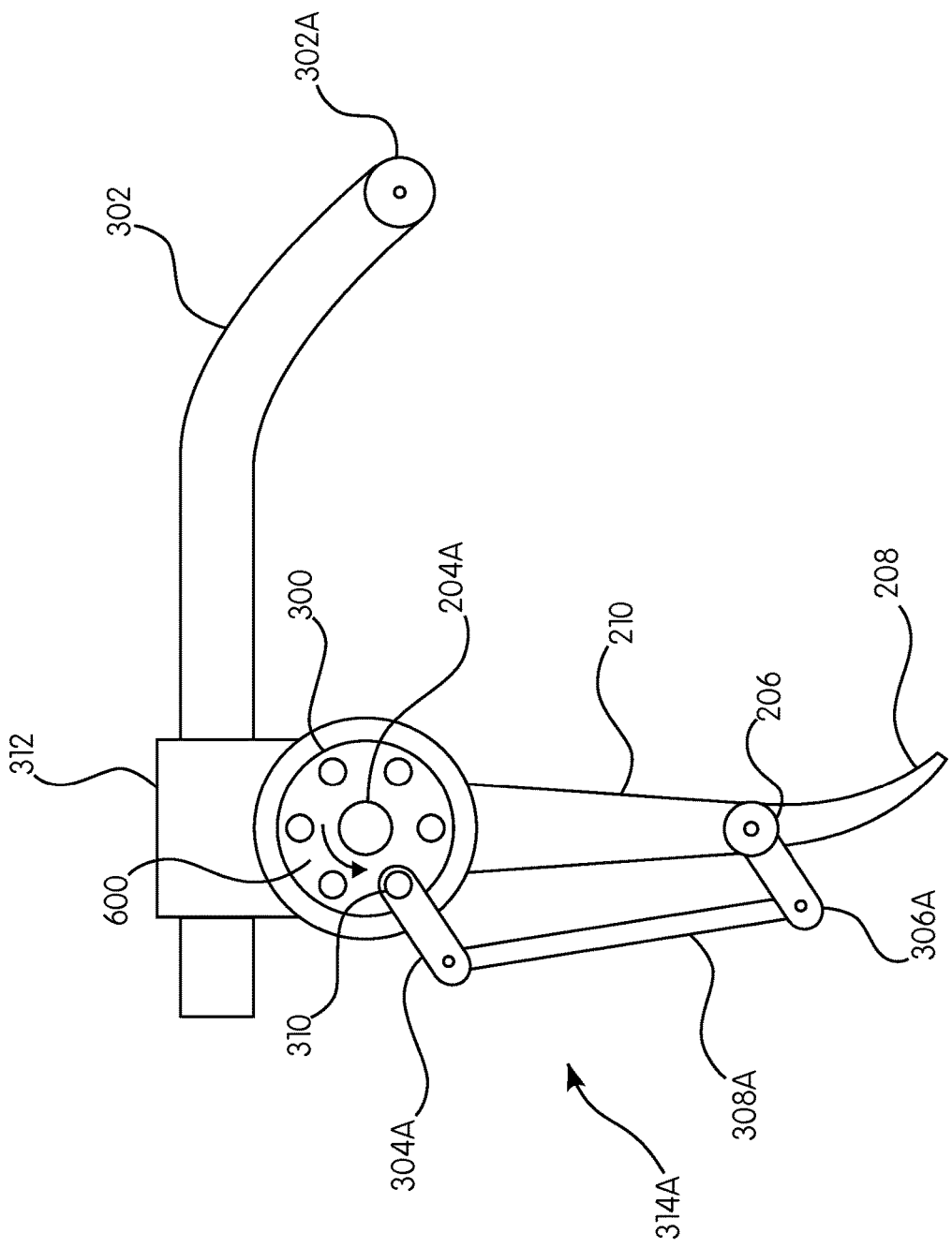
FIG. 3 is a partial side view of the exemplary embodiment of the rotatable coupler, the reel arm and the first reel assembly of FIG. 2.

Referring now to the drawings, wherein aspects of the subject disclosure are shown, FIGS. 1-3 illustrate an agricultural harvester 100 and a header 102 in accordance with an exemplary embodiment. For exemplary purposes only, the agricultural harvester is illustrated as a combine harvester.

Referring now to FIG. 1, the frame 104 is the structural chassis of the header 102 and allows for various components of the header to be attached thereto. The header 102 is attached to a forward end of the harvester 100, and configured to cut crops, including (without limitation) small grains (e.g., wheat, soybeans, grain, etc.), and to induct the cut crops into a feeder house 108 as the harvester 100 moves forward over a crop field.

The header 102 includes a floor 110 that is supported in desired proximity to the surface of a crop field. A cutter bar 106 of the header 102 extends transversely along a forward edge of the floor 110, i.e., in a widthwise direction of the harvester 100, and is bound by a first side edge 112 and an opposing second side edge 114, which are both adjacent to the floor 110. The cutter bar 106 is configured to cut crops in preparation for induction into the feeder house 108. It is appreciated that the cutter bar 106 includes one or more reciprocating sickles such as those disclosed in U.S. Pat. No. 8,151,547, the entire disclosure of which is incorporated by reference herein for all purposes.

The header 102 further includes an elongated, rotatable reel 116 which extends above and in close proximity to the cutter bar 106. The rotatable reel 116 is configured to cooperate with a draper belt in conveying cut crops to the feeder house 108 for threshing and cleaning. In an exemplary embodiment, the rotatable reel 116 is a split reel having a first reel assembly 200 and a second reel assembly 202 spanning widthwise between the first and second edges 112, 114. The first 200 and second reel assemblies 202 are mounted to the frame 104 of the header 102 and arranged in a side-by-side manner.

Referring now to FIGS. 1-9, in accordance with an exemplary embodiment, the header 102 comprises the frame 104, a reel arm 302, the first reel assembly 200, the second reel assembly 202, a rotatable coupler 300, a first linkage assembly 314A and a second linkage assembly 314B.

Referring to FIGS. 2-5, the reel arm 302 is configured substantially as shown. The reel arm 302, i.e., the support arm, is an elongated member configured to support the first and second reel assemblies 200, 202. The reel arm has a first end 302A connectable to the frame 104. The first end 302A may be connected to the frame 104 e.g., via welding, screws, etc. to form a rigid connection. However, it is appreciated that the connection could be pivotable e.g., via a pivot joint fixed to the frame 104 and the reel arm 302 would be pivotable attached thereto via e.g., a pivot pin, hinge or the like. The reel arm 302 may be tubular or solidly constructed. The reel arm 302 may be curved in shape at or about the first end 302A. However, it is appreciated that the reel arm may be constructed in various shapes including linear, curved, bent, cylindrical, conical, combinations thereof or the like.

Additionally, the reel arm 302 includes a mountable portion, i.e., a reel coupler mount 312 (FIG. 3), which is positioned along a length of the reel arm 302 and spaced from the frame 104. The reel coupler mount 312 is connected to the reel arm 302 for creating an independently rotatable interface for the rotatable coupler 300. Such a rotatable connection can include e.g., bushings, bearings and other components as is known in the art. The reel coupler mount 312 is configured to be mountable by the rotatable coupler 300 and is connectable to the reel arm 302 e.g., via welding, fasteners, such as pins, screws, etc. or may be integrally formed. In an aspect, for example, the reel coupler mount 312 can be slidably adjusted along the length of the reel arm 302 via a hydraulic cylinder controlled by an operator.

Figure 4:
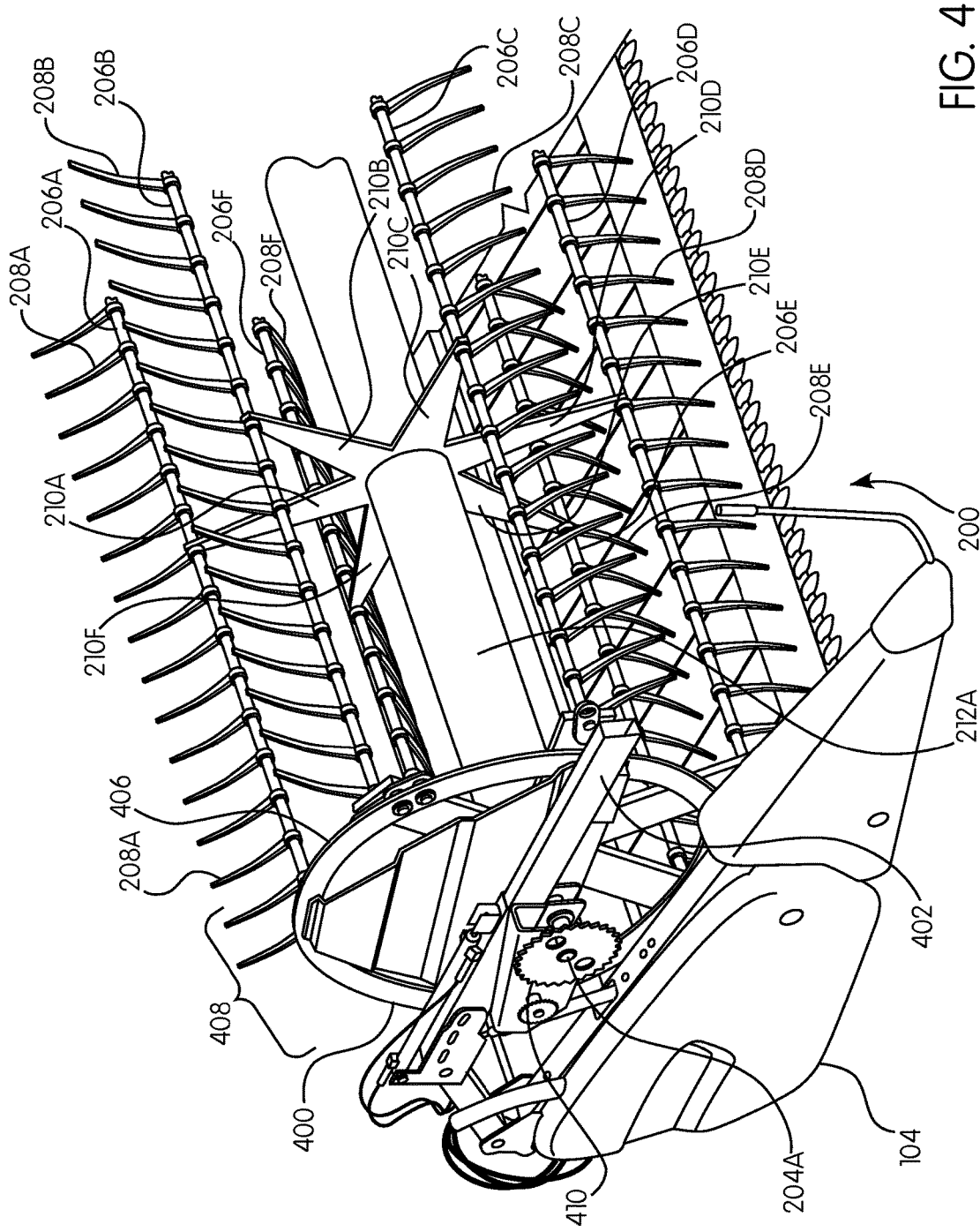
FIG. 4 is a partial side perspective view of an exemplary aspect of a first reel assembly in accordance with an exemplary embodiment of the subject disclosure.
Figure 5:
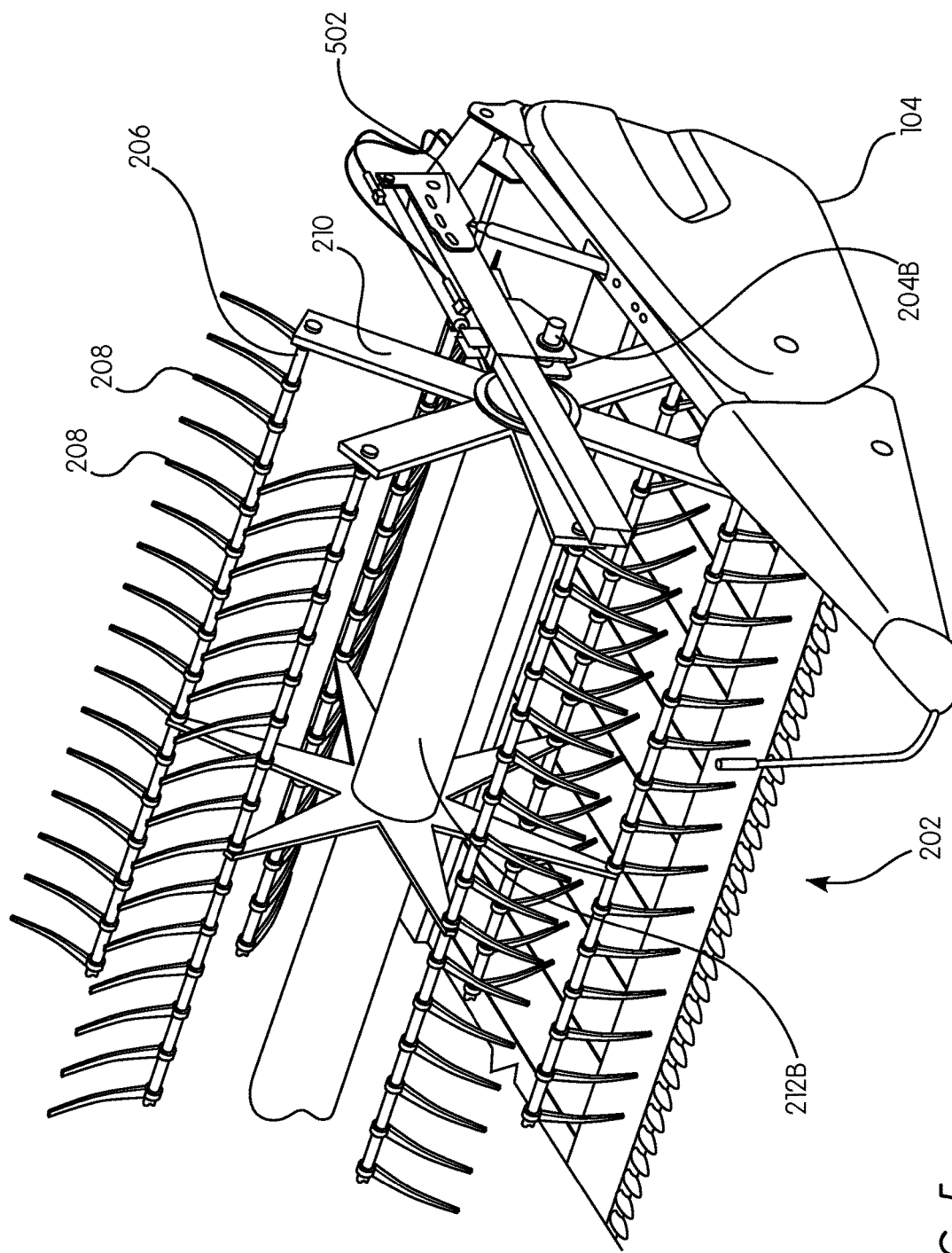
FIG. 5 is a partial side perspective view of an exemplary aspect of a second reel assembly in accordance with the subject disclosure.

Referring to FIGS. 4 and 5, in accordance with an exemplary embodiment, the header 100 includes a plurality of reel arms 402, 502 for supporting the reel assemblies 200, 202. For example, the header 100 may include a center reel arm (e.g., reel arm 302) and end reel arms 402, 502. It is appreciated that end reel arms 402, 502 can be configured similar to the reel arm 302 and/or may be configured to engage a central rotatable shaft 204A, 204B and/or configured to engage a respective reel tube 212A, 212B without the reel coupler mount 312. In other words, end reel arms 402, 502 may be configured to rotatably receive the central rotatable shaft 204A, 204B via, e.g., an aperture with bearings and bushings. In an aspect, for example, end reel arms 402, 502 can be mounted to a bracket (not shown) that can be slidably adjusted in a fore/aft direction.

Referring now to FIGS. 1-5, the first reel assembly 200 is configured substantially as shown. The first reel assembly 200 includes the central rotatable shaft 204A, a plurality of tine bars 206A-F, a plurality of tines 208A-F, a cam 400, a cam assembly 408 having a cam track 406, a drive mechanism 410 and a plurality of spider arms 210A-F.

The central rotatable shaft 204A is generally an elongated cylindrical member, e.g., an elongated tube, connectable to the rotatable coupler 300. Specifically, the central rotatable shafts 204A, 204B are configured to be received within an aperture 606 (FIG. 6) of the rotatable coupler 300. The central rotatable shafts 204A, 204B may be sized and shaped to pass through the aperture 606 such that the central rotatable shafts may rotate within the aperture. Alternatively, the central rotatable shafts 204A, 204B can be of unitary construction. Each central rotatable shaft may also include a reel tube (212A, 212B) which is an elongated cylindrical member within which the central rotatable shaft is received in.

The tine bars 206A-F are thin elongated members operatively connected to the cam 400 of the cam track 406 and to the central rotatable shaft 204A via the spider arms 210A-F. The tine bars 206A-F are spaced circumferentially apart from each other and are parallel to the central rotatable shaft 204A. Each tine bar 206A-F may be equipped with a plurality of tines, which extend transversely from the tine bars 206A-F for facilitating the collection of crop.

The cam assembly 408 including the cam 400 and the cam track 406 is the guide path about which the tine bars 206A-F travel. That is, the cam 400 with the cam track 406 is configured to guide the rotational path of the tine bars 206A-F. In an exemplary embodiment, the cam track 406 is rounded and non-circular but may be any shape necessary for facilitating efficient operation, e.g., circular, oval, and the like.

The drive mechanism 410 (FIG. 4) is configured to provide rotational motion to the central rotatable shafts 204A, 204B. For example, the drive mechanism may be a hydraulic motor or a gear configured to operatively engage the central rotatable shaft 204A and the reel tube 212A.

The spider arms 210A-F are elongated members extending radially from both the central rotatable shaft and the central reel tube. The spider arms 210A-F are fixedly connectable to the tine bars 206A-F for transmitting rotational motion from the central rotatable shafts. Exemplary spider arms 210A-F applicable to the subject disclosure are disclosed in U.S. Patent Application Publication No: 2016/0255773, the entire disclosure of which is incorporated by reference herein for all purposes.

In an exemplary embodiment, the second reel assembly 202 is structurally similar to the first reel assembly 200 except that it may or may not have a cam assembly. Therefore, extensive discussion of the second reel assembly 202 is not necessary for a complete understanding of the subject disclosure. The first reel assembly 200 by way of the rotatable coupler 300 described below acts as a drive reel for driving the second reel assembly 202. It is appreciated that the central rotatable shafts 204A, 204B can be configured as a single unitary shaft, such that the unitary central rotatable shaft passing through both the first reel assembly 200 and the second reel assembly 202.

Figure 9:
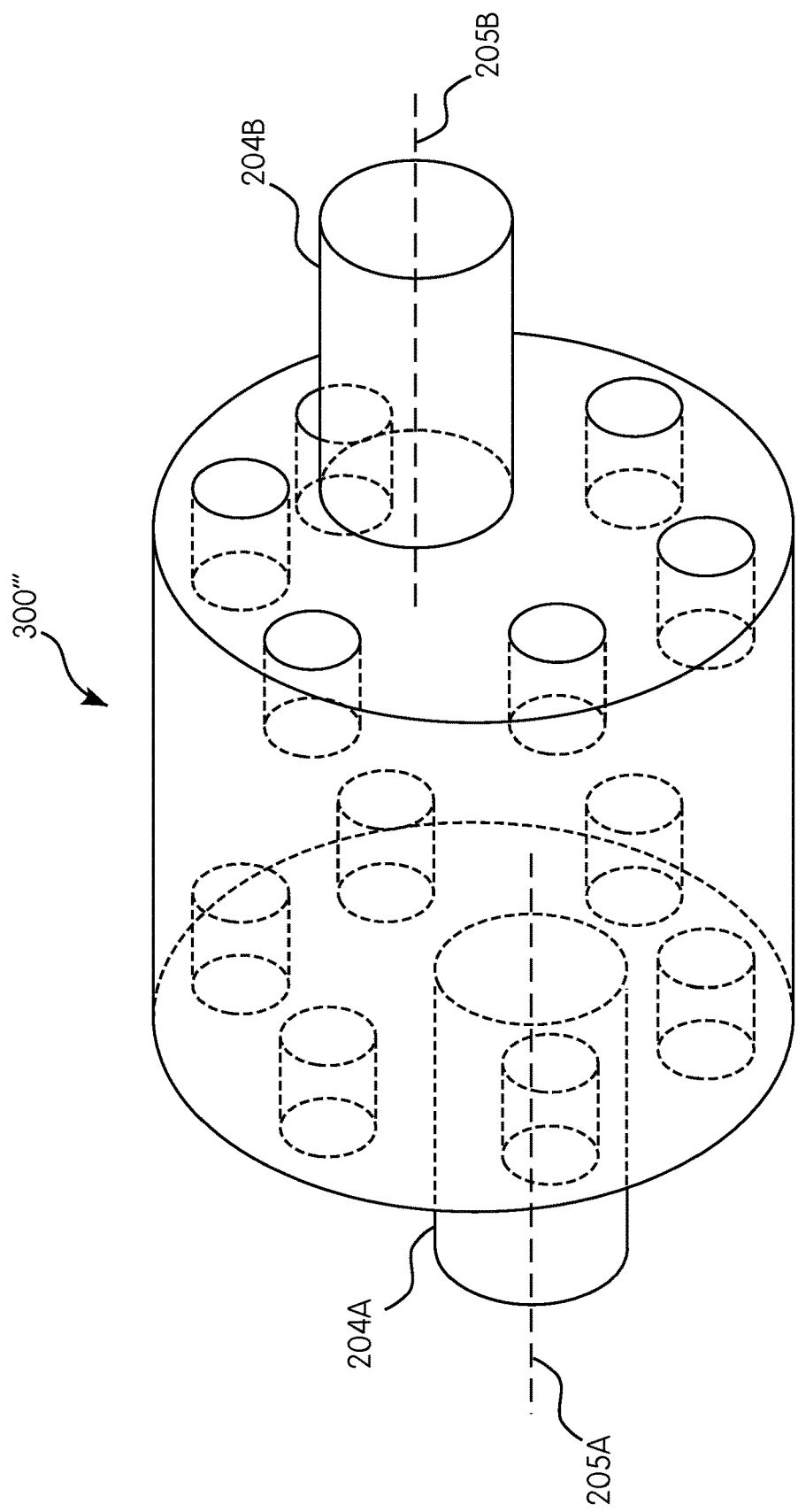
FIG. 9 is a perspective view of another rotatable coupler in accordance with an exemplary embodiment of the subject disclosure.

In another exemplary embodiment, the central rotatable shaft 204A passing through the first reel assembly 200 may be a separate shaft from the central rotatable shaft 204B passing through the second reel assembly 202. In this embodiment, a central longitudinal axis of the central rotatable shaft 204A of the first reel assembly 200 may be aligned with or may be offset from a central longitudinal axis of the central rotatable shaft 204B of the second reel assembly 200. For example, as shown in FIG. 9 (rotatable coupler 300'''), a central longitudinal axis 205A of the central rotatable shaft 204A of the first reel assembly 200 is offset from a central longitudinal axis 205B of the central rotatable shaft 204B of the second reel assembly 202.

In an exemplary embodiment, the rotatable coupler 300 is configured as shown in FIGS. 1-3 and 6. The rotatable coupler 300 is configured to be rotatably mounted to the reel coupler mount 312. The rotatable coupler 300 has a first lateral side 600 and a second lateral side 602 opposite the first lateral side 600. Both lateral sides of the rotatable coupler 300 are generally circular about a central axis of rotation 216 and have a generally planar surface, e.g., a cylindrical shape. Although in an exemplary embodiment, the rotatable coupler 300 is substantially cylindrical, various cross-sectional shapes including square, rectangular, triangular, or the like may also be utilized, in addition to the lateral surfaces being non-planar e.g., curved, semi-spherical and the like.

In an exemplary embodiment, the rotatable coupler 300 (FIG. 6) includes apertures 604A-F. In accordance with another exemplary embodiment (FIG. 7), the rotatable coupler 300' includes recesses 700A-F. Referring back to FIG. 6, the apertures 604A-F are spaced apart and circumscribe the central axis of rotation 216 on each of the first and second lateral sides 600, 602. The apertures 604A-F (or recesses 700A-F) are each sized to receive a respective control shaft 310, as further discussed below.

Figure 7:
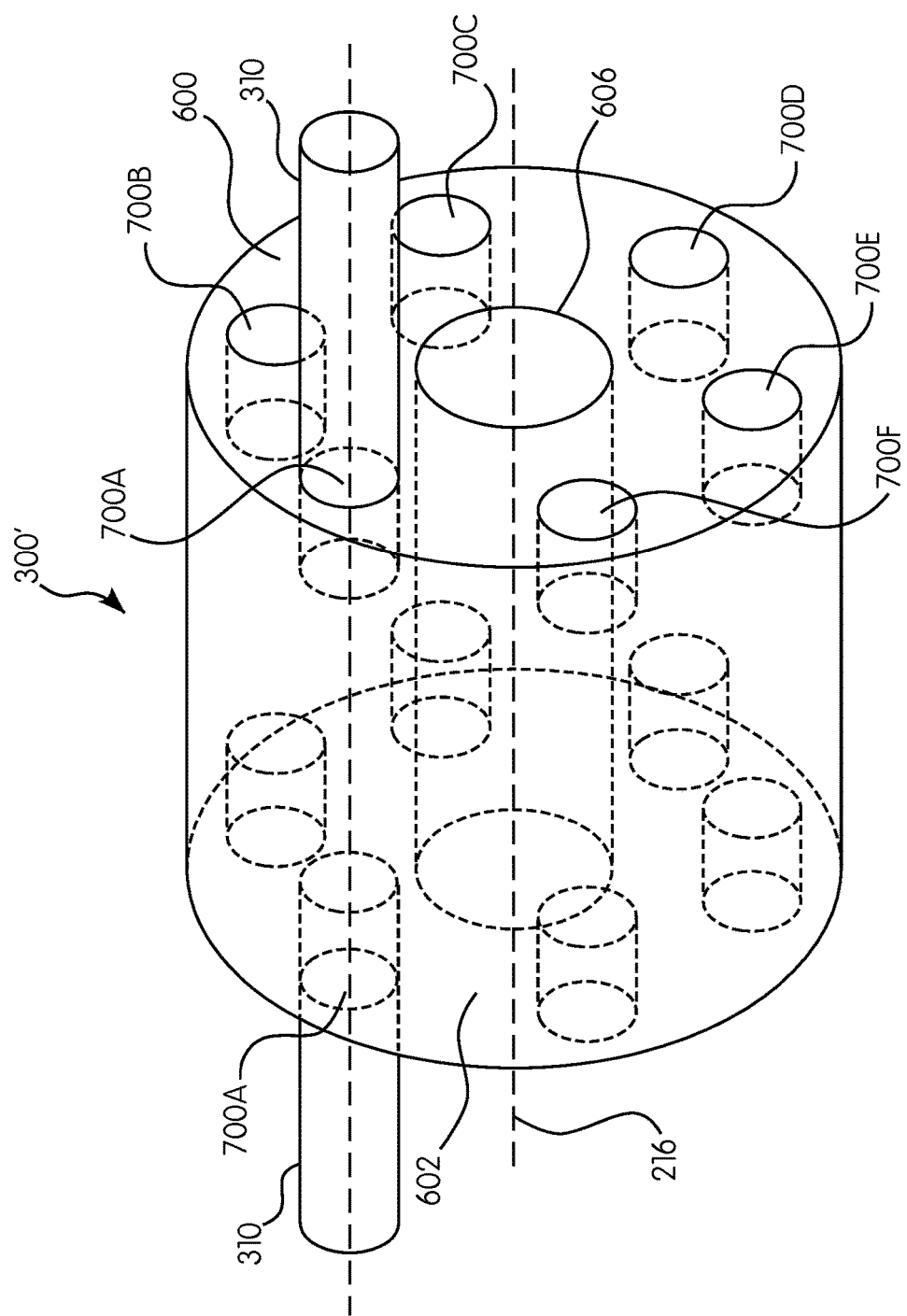
FIG. 7 is another perspective view of the rotatable coupler of FIG. 6.

In accordance with an exemplary embodiment illustrated in FIGS. 2, 3 and 7, the control shaft 310 is a substantially elongated tubular or cylindrical structure, such as a pin or dowel sized to be received by one of the apertures 604A-F (or recesses 700A-F). The control shaft 310 is configured to extend through and be rotatably received within the apertures 604A-F.

Figure 6:
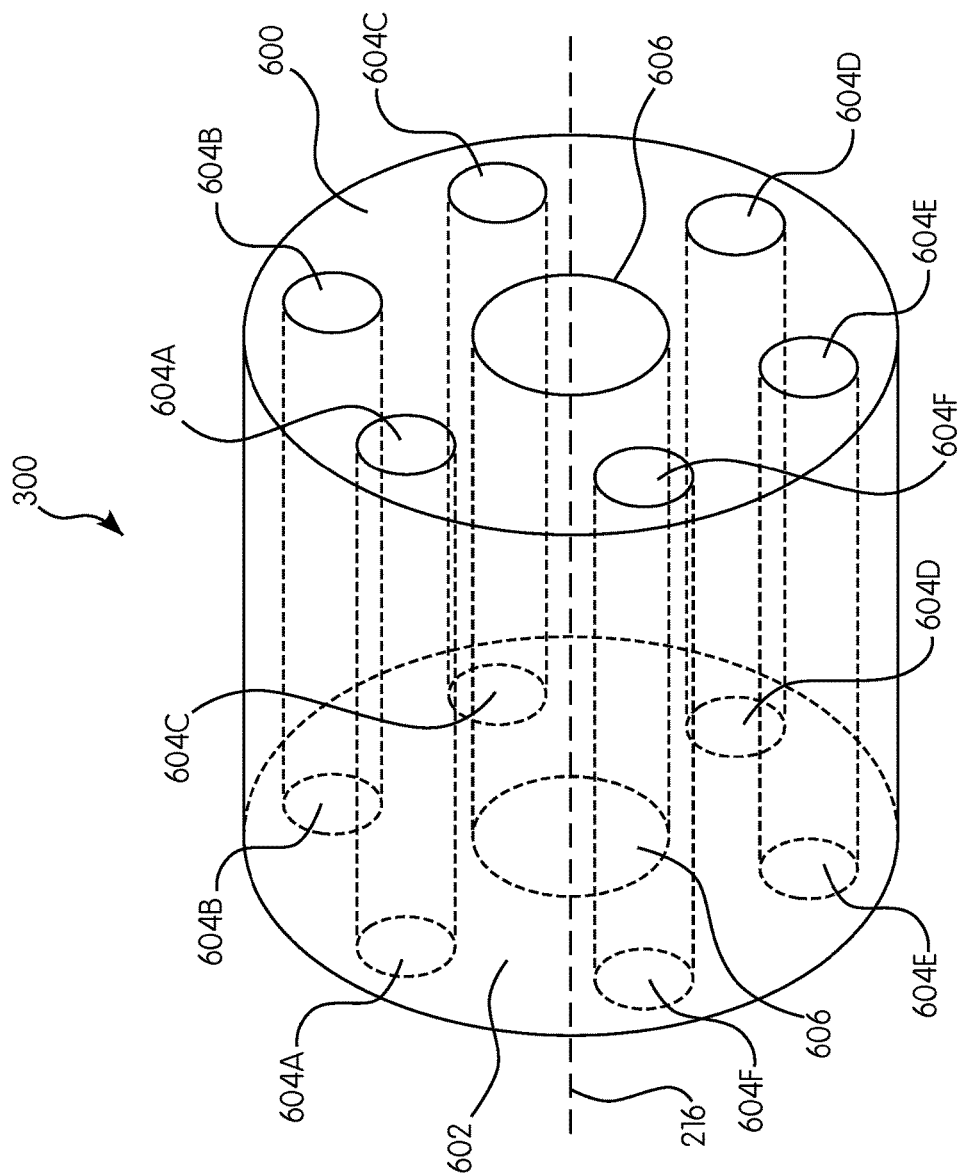
FIG. 6 is a perspective view of a rotatable coupler in accordance with an exemplary embodiment of the subject disclosure.

In the exemplary embodiment illustrated in FIG. 6, the apertures 604A-F, 606 extend from the first lateral side 600 of the rotatable coupler 300 to the second lateral side 602 of the rotatable coupler 300. In other words, the apertures 604A-F, 606 are through holes such that the plurality of control shafts 310 extend therethrough and generally circumscribe the central axis of rotation 216. Additionally, the plurality of control shafts 310 are circumferentially spaced around the central rotatable shafts 204A, 204B. In an aspect, the aperture 606 may be located centrally such that the central rotatable shafts 204A, 204B can extend through coaxial with the central axis of rotation 216.

Figure 8:
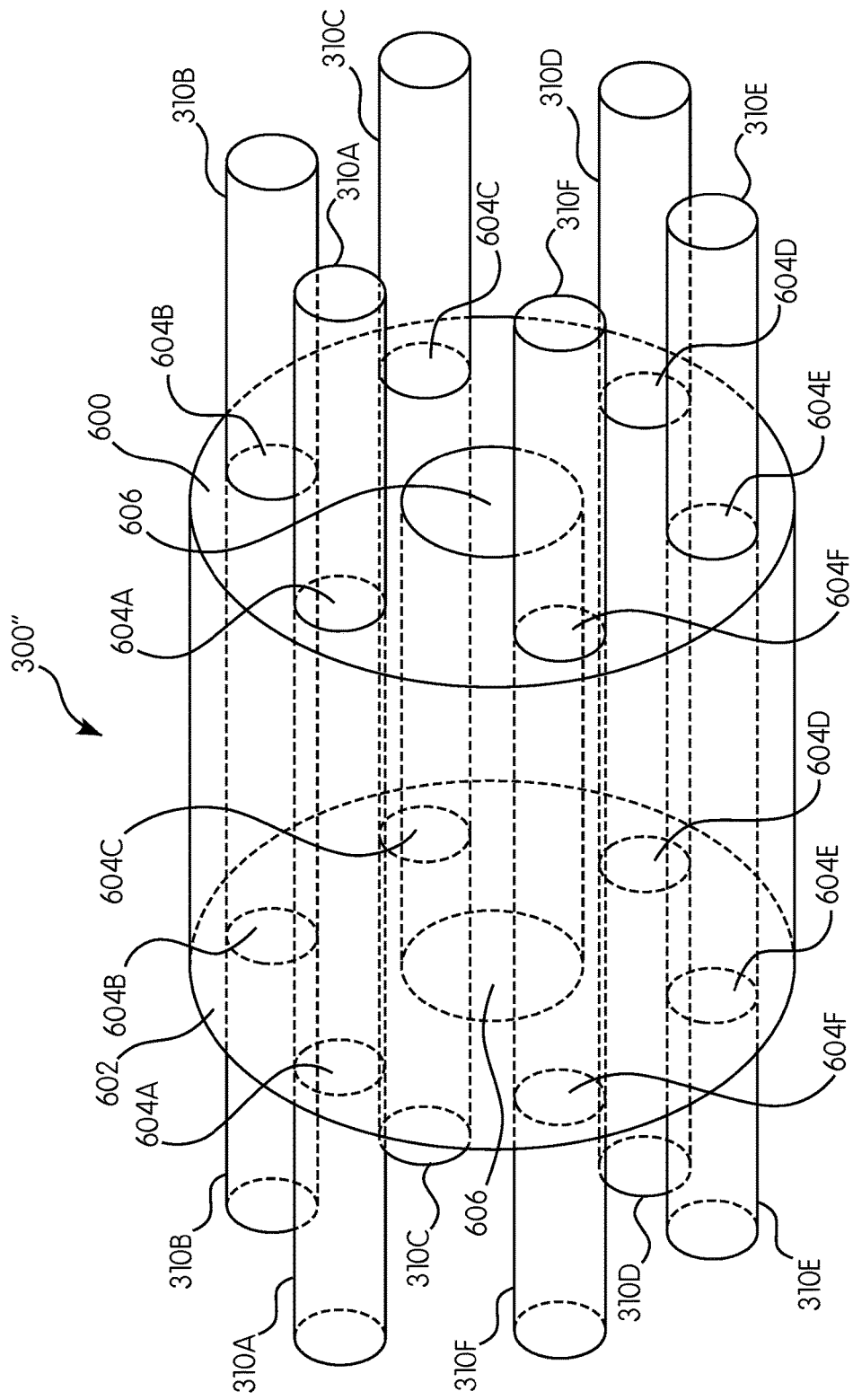
FIG. 8 is a perspective view of a rotatable coupler in accordance with an exemplary embodiment of the subject disclosure.

In an exemplary embodiment illustrated in FIG. 8, the rotatable coupler 300'' includes six (6) apertures 604A-F to receive six (6) control shafts 310A-F. However, it is appreciated that a different number of control shafts and apertures can be utilized such as 1, 2, 3, 4, 5, 7, 8, 9, 10, etc. Accordingly, the rotatable coupler 300'' can be configured to receive one or more control shafts 310A-F. For purposes of illustration, only control shaft 310 is primarily described below. It is to be understood, however, that control shafts 310A-F are similarly configured to control shaft 310.

Referring to FIG. 7, in another exemplary embodiment, recesses or counterbores 700A-F are utilized instead of apertures 604A-F. In this exemplary embodiment, the recesses 700A-F marginally extend into the lateral sides 600, 602 for receiving independent control shafts 310. For purposes of convenience, only a single control shaft 310 is shown on each respective lateral side 600, 602. However, it is to be understood that each recess 700A-F is configured to receive a respective control shaft 310. Each control shaft is configured to extend longitudinally from the recesses 700A-F on opposite lateral sides 600, 602 of the rotatable coupler 300'. The control shafts on opposing lateral sides 600, 602 may be coaxial or offset with respect to their central longitudinal axis. In an exemplary embodiment, the rotatable coupler 300' includes a plurality of control shafts 310A-F extending from opposite lateral sides 600, 602 of the rotatable coupler 300', wherein a pair of the plurality of control shafts are coaxial.

Referring now to FIGS. 2 and 3, each of the first and second linkage assemblies 314A, 314B include a first link 304A, 304B connectable to a respective control shaft 310, a second link 306A, 306B for connecting to a respective reel tine bar 206A-F and a third link 308A, 308B for connecting the first and second links of the respective first and second linkage assemblies 314A, 314B. For purposes of clarity, the present exemplary embodiment refers to both first and second linkage assemblies 314A, 314B, but only the structure of the first linkage assembly 314A is shown in FIG. 3 and generally described below. It is to be understood, however, that the second linkage assembly 314B is substantially a mirror-like image construction of the first linkage assembly 314A. In other words, each of the first and second linkage assemblies 314A, 314B include a first link connected to the control shaft, a second link for connecting to one of the tine bars of the plurality of tine bars of respective first and second reel assemblies and a third link connecting the first and second links of respective first and second linkage assemblies.

In accordance with an aspect of an exemplary embodiment illustrated in FIGS. 2-4 and 6, the first linkage assembly 314A is connectable to the rotatable coupler 300 about the first lateral side 600 and the second linkage assembly 314B is connectable to the rotatable coupler 300 about the second lateral side 602 via the first link 304A, 304B. The first link 304A, 304B is an elongated member fixedly connected to the control shaft 310 and pivotably connected to the respective third link 308A, 308B. Fasteners, e.g., nuts and bolts or the like, may be utilized to make a fixed connection between the first link and the control shaft. In other words, each of the first links are rigidly connected to the control shaft 310 for rotation therewith. The pivotable connection between the first link 304A, 304B and the third link 308A, 308B can be achieved by e.g., a pivot pin, a hinge or the like.

Each of the second links 306A, 306B, i.e., driver arms, is rigidly connectable to the tine bar 206A-F of respective first and second reel assemblies 200, 202 for rotation therewith. Each second link 306A, 306B is an elongated structure fixedly connected to the tine bar 206A-F and pivotably connected to the respective third link 308A, 308B. Suitable fasteners e.g., nuts and bolts or the like may be utilized to make a fixed connection between the respective second link 306A, 306B and the reel tine bar 206A-F. The pivotable connection between the respective second link 306A, 306B and the respective third link 308A, 308B can be achieved by e.g., a pivot pin, a hinge and/or the like. Each of the third links 308A, 308B, i.e. control arms, are elongated members having opposing ends pivotably connected with respective first and second links.

With reference now to FIGS. 1-5, there is illustrated an assembled reel arm 302, the first reel assembly 200 and the second reel assembly 202 of the header in accordance with an exemplary embodiment of the subject disclosure. As discussed above, the first and second reel assemblies 200, 202 are mounted to the frame 104 of the header 102 by their respective central rotatable shafts 204A, 204B and end reel arms 402, 502. Specifically, the reel arm 302 extends forwardly from the frame 104 and between the first and second reel assemblies 200, 202. In accordance with an aspect, the rotatable coupler 300 is mounted to the reel coupler mount 312 of the reel arm 302 and connected to at least one of the central rotatable shafts 204A, 204B via the aperture 606.

In the exemplary embodiment of the subject disclosure, the first reel assembly 200 connects to the first lateral side 600 of the rotatable coupler 300 and the second reel assembly 202 connects to the second lateral side 602 of the rotatable coupler 300, such that rotational motion from the first reel assembly 200 is transmitted to the second reel assembly 202 and vice versa via the central rotatable shaft(s) 204A, 204B. Specifically, the central rotatable shaft(s) 204A, 204B pass through the rotatable coupler 300 for rotation therewith to connect to the respective first and second linkage assemblies 314A, 314B. As previously discussed, the spider arms 210A-F extend radially from the central rotatable shaft(s) 204A, 204B and are fixedly connectable to the tine bars 206A-F. As a result, rotational motion of the central rotatable shafts causes rotation of the spider arms 210A-F and carries the tine bars 206A-F around the central rotatable shafts.

Generally, the rotatable coupler 300 is positioned between the first reel assembly 200 and the second reel assembly 202. In an aspect, the respective control shafts 310 pass through the apertures 604A-F in the rotatable coupler 300 and connect to each of the first links 304A, 304B of the respective first and second linkage assemblies 314A, 314B.

In sum, the subject disclosure includes a header for an agricultural harvester comprising a frame, a first reel assembly including a central rotatable shaft, and a plurality of tine bars extending widthwise across the first reel assembly and connected to the central rotatable shaft for rotation therewith, a reel arm connected to the frame and supporting the first reel assembly, a rotatable coupler circumscribing the central rotatable shaft and connected to the reel arm, and a first linkage assembly connecting the rotatable coupler to one of the plurality of tine bars of the first reel assembly. The header further comprises a second reel assembly adjacent to the first reel assembly, the second reel assembly having a tine bar extending widthwise across the second reel assembly and a second linkage assembly on a side of the rotatable coupler opposite the first linkage assembly connecting the rotatable coupler to the tine bar of the second reel assembly.

As shown in FIGS. 2 and 4, the exemplary embodiment operates by transmitting rotational motion from the first reel assembly 200 to the second reel assembly 202 thereby keeping the rotational motion of the reel tine bar 206A-F in each of the first and second reel assemblies 200, 202 in sync. Specifically, the drive mechanism 410 engages the central rotatable shaft 204A of the first reel assembly 200 which causes the central rotatable shaft 204A to rotate about the central rotational axis 216. The central rotatable shaft(s) 204A, 204B pass through the rotatable coupler for rotation therewith to connect to the respective first and second reel assemblies 200, 202. The rotatable coupler transmits rotational motion between the reel tine bars 206A-F of the first and second reel assemblies 200, 202 and provides synchronized movement of the reel tine bars 206A-F equipped with tines 208A-F. Additionally, the rotatable coupler transmits the tine angle/pitch from the reel tine bars of the first reel assembly 200 to the reel tine bars of the second reel assembly 202.

As the reel tine bars 206A-F of the first reel assembly 200 are rotated along the cam track 406, the connected tine bars 206A-F of the second reel assembly 202 are similarly guided via the rotatable coupler. Therefore, a second cam is not needed for guiding the tine bars 206A-F on the second reel assembly 202. In other words, in accordance with an exemplary embodiment, the header consists essentially of the single cam assembly 400 for guiding movement of the first and second reel assemblies. The cam assembly 400 includes the cam track 406 for operatively engaging a single reel assembly e.g., the first reel assembly 200.

The rotational position of the tine bars 206A-F is transmitted via the control shaft(s) 310 of the first and second linkage assemblies 314A, 314B. For purposes of clarity, the rotational motion of the first linkage assembly of the first reel assembly 200 will be described below. As previously discussed, the second link 306A is rigidly connected to a respective tine bar 206A-F of the first reel assembly 200. The second link 306A is connected to the first link 304A via the third link 308A. As the first link 304A is rigidly connected to the control shaft 310, movement of the first link 304A causes rotation of the control shaft 310. The first link 304B of the second linkage assembly 314B of the second reel assembly 202 is also rigidly connected to the control shaft 310. As such, rotational motion of the first link 304A of the first linkage assembly 314A of the first reel assembly 200 causes corresponding rotational motion of the first link 304B of the second linkage assembly 314B of the second reel assembly 202.

The advantages of having the rotatable coupler transmitting movement from the first and second reel assemblies are apparent. Specifically, connecting the rotatable coupler directly to the central rotatable shaft and to the linkage assemblies allows the header to be constructed without a separate cam and cam track for guiding movement between the first and second reel assemblies. That is, the header can be constructed with only a single cam assembly. Additionally, allowing the rotatable coupler to be coupled with the linkage assemblies allows the reel tine bars to synchronize the timing of movement between tine bars and synchronizes positioning of the tines, which increases efficiency in collection by positioning all tines at the same angle for crop collection.

While the subject disclosure has been described with reference to exemplary embodiments, it will be appreciated by those skilled in the art that various changes may be made and equivalents may be substituted for elements thereof without departing from the scope of the subject disclosure. For example, features described in one embodiment may be incorporated into a different embodiment, such as use of apertures or recesses in the rotatable coupler to connect to the control shaft. Additionally, features described in one manner may alternatively be accomplished by other techniques such as pivotable connections.

In addition, modifications may be made to adapt a particular situation or material to the teachings of the exemplary embodiments without departing from the essential scope thereof. For example, the header can include one or more reel arms with the rotatable coupler mounted to the reel coupler mount and the reel assemblies may be identical or different from each other. It is to be understood, therefore, that the exemplary embodiments not be limited to the particular aspects disclosed, but it is intended to cover modifications within the spirit and scope of the subject disclosure as defined by the appended claims.

I claim:

1. A reel arm for a header of an agricultural harvester comprising:
   a rotatable coupler having a central rotational axis, the rotatable coupler having a control shaft extending therethrough parallel to the central rotational axis;
   a first linkage assembly that includes:
      a first end connected to the control shaft about a first lateral side of the rotatable coupler, and
      a second end opposite the first end for connecting to a reel tine bar of a first reel assembly of the header; and
   a second linkage assembly that includes:
      a first end connected to the control shaft about a second lateral side of the rotatable coupler, and
      a second end opposite the first end for connecting to a reel tine bar of a second reel assembly of the header.

2. The reel arm of claim 1, wherein each of the first and second linkage assemblies include:
   a first link connected to the control shaft;
   a second link for connecting to a respective reel tine bar; and
   a third link connecting the first and second links.

3. The reel arm of claim 2, wherein the first link of each of the first and second linkage assemblies is rigidly connected to the control shaft for rotation therewith.

4. The reel arm of claim 2, wherein the second link of each of the first and second linkage assemblies is rigidly connected to the reel tine bar of the respective first and second reel assemblies for rotation therewith.

5. The reel arm of claim 2, wherein the third link of each of the first and second linkage assemblies is pivotably connected to the first and second links of respective first and second linkage assemblies.

6. The reel arm of claim 1, wherein the rotatable coupler includes a plurality of control shafts each extending therethrough and circumscribing the central rotational axis.

7. The reel arm of claim 6, wherein each of the plurality of control shafts is connected to a respective first and second linkage assembly.

8. A header of an agricultural harvester comprising:
   a frame;
   a reel arm connected to the frame;
   a first reel assembly connected to the frame, the first reel assembly including:
      a central rotatable shaft, and
      a plurality of tine bars extending widthwise across the first reel assembly and connected to the central rotatable shaft for rotation therewith;
   a second reel assembly connected to the frame, the second reel assembly including:
      a central rotatable shaft, and
      a plurality of tine bars extending widthwise across the second reel assembly and connected to the central rotatable shaft for rotation therewith;
   a rotatable coupler supported by the reel arm, and connected to at least one of the central rotatable shafts of the first and second reel assemblies;
   a first linkage assembly connecting the rotatable coupler to one of the plurality of tine bars of the first reel assembly; and
   a second linkage assembly connecting the rotatable coupler to one of the plurality of tine bars of the second reel assembly.

9. The header of claim 8, wherein the rotatable coupler includes a control shaft extending therethrough and spaced from the central rotatable shaft.

10. The header of claim 9, wherein each of the first and second linkage assemblies include:
    a first link connected to the control shaft;
    a second link for connecting to one of the tine bars of the plurality of tine bars of respective first and second reel assemblies; and
    a third link connecting the first and second links of respective first and second linkage assemblies.

11. The header of claim 9, wherein each of the first and second linkage assemblies is connected to the control shaft.

12. The header of claim 8, further consisting essentially of a single cam assembly for guiding movement of the first and second reel assemblies.

13. The header of claim 12, wherein the single cam assembly includes a cam track for operatively engaging the first reel assembly.

14. The header of claim 8, wherein the rotatable coupler is positioned between the first reel assembly and the second reel assembly.

15. The header of claim 8, wherein the rotatable coupler includes a plurality of control shafts each extending therethrough and circumferentially spaced around the central rotatable shaft.

16. The header of claim 15, wherein each of the plurality of control shafts is operatively connected to a respective first and second linkage assembly.

17. The header of claim 8, wherein the rotatable coupler includes a plurality of control shafts extending from opposite lateral sides of the rotatable coupler, and wherein a pair of the plurality of control shafts are coaxial.

18. The header of claim 8, wherein a central longitudinal axis of the central rotatable shaft of the first reel assembly is offset from a central longitudinal axis of the central rotatable shaft of the second reel assembly.

19. A header of an agricultural harvester comprising:
    a frame;
    a first reel assembly including:

a central rotatable shaft having a longitudinal axis, and
a plurality of tine bars extending widthwise across the first reel assembly and connected to the central rotatable shaft for rotation therewith;
a drive mechanism operatively connected to a lateral side of the first reel assembly;
a reel arm connected to the frame and supporting the first reel assembly about its medial side;
a rotatable coupler having a rotational axis aligned with the longitudinal axis of the central rotatable shaft and connected to the reel arm;
a first linkage assembly connecting the rotatable coupler to one of the plurality of tine bars of the first reel assembly; and
a second linkage assembly connected to the rotatable coupler and extending medially from the first reel assembly.

20. The header of claim 19, further comprising:
a second reel assembly adjacent to the medial side of the first reel assembly, the second reel assembly having a tine bar extending widthwise across the second reel assembly; and
the second linkage assembly is on a side of the rotatable coupler opposite the first linkage assembly connecting the rotatable coupler to the tine bar of the second reel assembly.

\* \* \* \* \*